United States Patent [19]

Antonelli et al.

[11] Patent Number: 4,713,785
[45] Date of Patent: Dec. 15, 1987

[54] METHOD OF INHIBITING PROCESSING OF DUPLICATIVE CODED LABEL SIGNALS

[75] Inventors: Douglas C. Antonelli, Raleigh, N.C.; Patricia M. Branscomb, Woodbridge, Va.; Eric C. Broockman, Raleigh, N.C.; LeRoy D. Dickson, Raleigh, N.C.; Caralee P. Koppel, Raleigh, N.C.; Richard Ossowski, Raleigh, N.C.; Olen L. Stokes, Jr., Cary, N.C.

[73] Assignee: International Business Machines Corporation, Armonk, N.Y.

[21] Appl. No.: 724,435

[22] Filed: Apr. 18, 1985

[51] Int. Cl.⁴ .................. G06F 15/24; G06K 7/10
[52] U.S. Cl. .................. 364/569; 235/463; 235/466; 364/404
[58] Field of Search .............. 235/455, 457, 462, 463, 235/466; 364/405–407, 569, 705, 709

[56] References Cited

U.S. PATENT DOCUMENTS

| | | | |
|---|---|---|---|
| 4,146,782 | 3/1979 | Barnich | 235/466 |
| 4,272,675 | 6/1981 | Blanford et al. | 235/463 |
| 4,329,574 | 5/1982 | Jordan, Jr. | 235/466 |
| 4,431,912 | 2/1984 | Dickson et al. | 235/466 |
| 4,578,570 | 3/1986 | Mazumder et al. | 235/466 |
| 4,626,670 | 12/1986 | Miller | 235/436 |

Primary Examiner—Felix D. Gruber
Assistant Examiner—Kevin J. Teska
Attorney, Agent, or Firm—Gerald R. Woods

[57] ABSTRACT

A system is disclosed for preventing processing of duplicative coded label signals generated by a scanner lacking item detectors. The system establishes a variable lockout time as a function of operator performance. Any detected label candidate which duplicates a candidate received within the lockout time is assumed to be duplicative. Any transfer to the terminal is inhibited. Operator performance is tracked by measuring the inter-item arrival times for candidates actually transferred to the terminal. The inter-item arrival times are averaged over a given number of items. The average value is used to select a lockout time which is generally proportional to the average inter-item arrival time.

15 Claims, 6 Drawing Figures

| UPPER LIMIT OF AIAT | INDEX LEVEL (IL) | LOCKOUT TIME (LT) |
|---|---|---|
| 500 | 0 | T0 |
| 500+R | 1 | T1 |
| 500+2R | 2 | T2 |
| 500+3R | 3 | T3 |
| 500+4R | 4 | T4 |
| 500+5R | 5 | T5 |
| 500+6R | 6 | T6 |
| 500+7R | 7 | T7 |
| 500+8R | 8 | T8 |

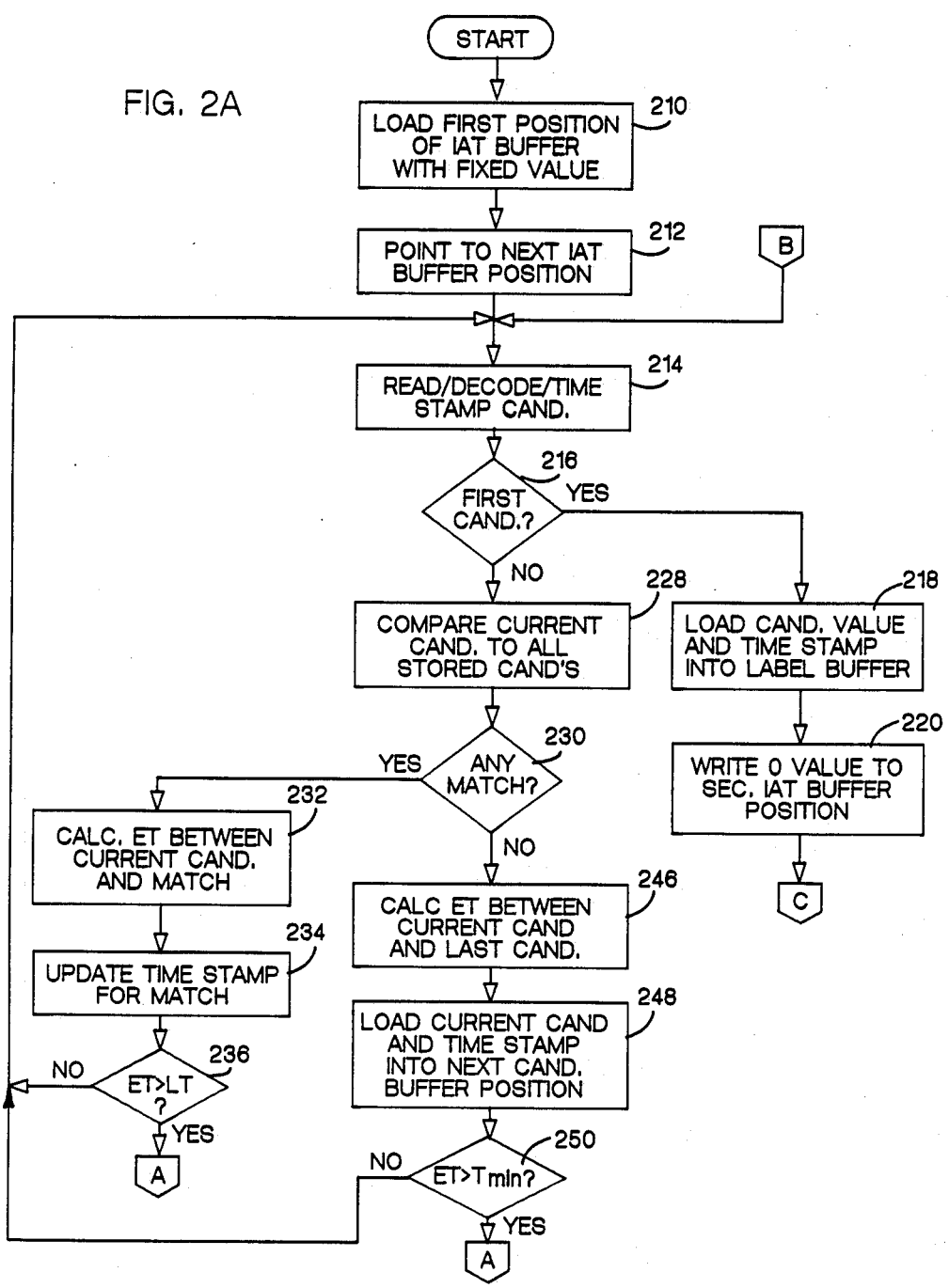

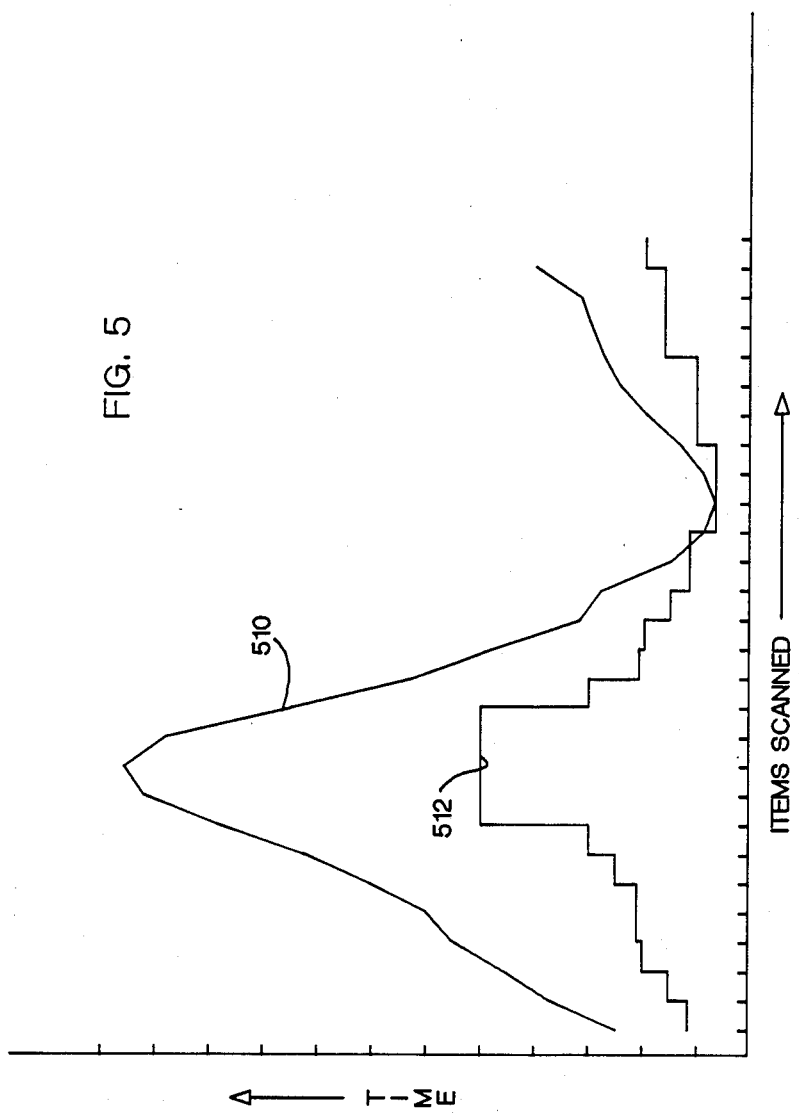

METHOD OF INHIBITING PROCESSING OF DUPLICATIVE CODED LABEL SIGNALS

TECHNICAL FIELD

The present invention relates to optical scanners and more particularly to a method of controlling the operation of an optical scanner to inhibit processing of duplicative coded label signals.

PRIOR ART

One of the more significant changes in supermarket operation in the recent past has been the increased use of computer-based point-of-sale systems. Such systems may include optical scanners capable of reading bar code symbols printed on or otherwise attached to items by the producer or, in some instances, by supermarket employees.

A typical optical scanner is incorporated into a customer checkout stand with virtually all of the scanner components being located out of sight below the checkout stand surface. In one type of scanner, the only scanner component which may be visible to a customer would be a transparent scanner window in the checkout stand surface. A typical scanner includes a laser and a scan pattern generator which deflects light emanating from the laser to produce a multiple line scan pattern at the scanner window. When a grocery item is passed over the scanner window, the laser beam is reflected from that item back through the window. The amount of light that is reflected at any given instant of time depends on the reflectivity of the grocery item at the point at which it is struck by the laser beam. When the beam is crossing a bar code label, the reflected optical signal is representative of the label pattern.

A photo detector converts the optical signal to an electrical signal which is applied to dedicated hardware or to a microprocessor which finds and decodes the label in the stream of electrical signals. When the label has been found and decoded, further error checking operations may be performed. If the error checking operations are satisfied, the label is passed on to a point-of-sale terminal or a store controller where it is used to access records which provide a brief description of the grocery item as well as pricing information. The item description and pricing information are used within a point-of-sale terminal at the checkout lane to prepare a descriptive customer receipt tape and to calculate transaction totals.

In the time normally required to pass a grocery item over a scanner window, the multiple line scan pattern is usually repeated several times. Duplicative label signals will often be detected during the passage of a grocery item over the scanner window. The scanner must be capable of discriminating between duplicative label signals from a single item and multiple label signals produced when two identical items are passed over the scanner window in rapid succession. This is sometimes referred to as a double-sell problem since a failure to discriminate between duplicative signals from one item and multiple signals from two identical items may result in a single item being "sold" or processed twice.

One known technique for handling duplicative label signals requires that an item detector be located at the trailing edge of the scanner window. Any label signals which are generated before the item passes the trailing edge item detector are assumed to be a result of scanning single grocery item. The trailing edge item detector is usually a photodetector arrangement in which a light source and a light detector are arranged on opposite sides of the checkout stand surface in housings which extend upwardly from the scanner surface.

There has been a desire to avoid the use of item detectors for a number of reasons. One reason is that such item detectors obviously increase the manufacturing costs of the scanner. Another reason is that the housings containing the item detector components can be jarred out of alignment when struck by heavy or hard grocery items, such as heavy canned goods. Keeping the item detector components in alignment represents an undesirable, added maintenance cost. Finally, the housings themselves may snag bulky or heavy items, making it more difficult for the checkout clerk to operate at a highly productive level.

Because of the problems inherent in the use of item detectors in a scanner, so-called flat top scanners have been developed. Such scanners have a flat surface to facilitate movement of heavy or bulky grocery items. There are no item detectors at either edge of the scanner window.

The lack of a trailing edge item detector means that the double-sell problem has to be handled differently than it had been in earlier scanners.

One known technique for handling the double-sell problem in a flat top scanner involves the use of a fixed time interval or lockout time. If identical label signals are detected within this lockout time, the assumption is made that the label information is the result of passing a single grocery item slowly over the scanner window. Conversely, once the lockout time elapses, subsequent signals are assumed to be the result of passing a second grocery item over the scanner window, even where those signals are identical to the previously decoded signals.

A single lockout time value is not necessarily suitable for different checkout clerks or even for the same clerk at different times. If a checkout clerk is working quickly, that clerk may pass two identical items over the scanner window in rapid succession. If the lockout time is long, the scanner may erroneously assume a single item has been scanned. Since most scanners use a positive feedback, such as an indicator light or an audible tone, to inform a clerk that an item has been properly scanned, the lack of such feedback in this situation will cause the clerk to repeat a scan of the second item. The repeated scan disrupts the clerk's routine and reduces the productivity of the clerk. On the other hand, if the lockout time is set low to accommodate a fast clerk, a slower clerk may move a single item over the window so slowly that the same item may be detected properly once and then, after the lockout time has expired, a second time. This would be most likely to occur when a slow clerk must re-scan an item. When the clerk moves the item backward or toward the leading edge of the window, a valid scan may result. If the clerk takes too long in reversing movement of the item toward the trailing edge of the window, a second valid scan can result. In that situation, the scanner would record the single item as two separate, but identical items. Unless the clerk or the customer catch the error, the customer will be overcharged.

SUMMARY

The present invention is an improved method for controlling the operation of an optical scanner to inhibit the processing of duplicative coded label signals through the use of a dynamically adjustable lockout time.

The method involves the step of recording the time of arrival of each label candidate. An inter-item arrival time or IAT is calculated for successive pairs of candidates actually transferred to an associated terminal. An average IAT is calculated for a fixed number of transferred candidates. A variable lockout time is selected as a function of a calculated average IAT. Any potential candidate which matches any label stored in a label buffer, usually the last transferred candidate is rejected when the IAT between the two matching candidates is less than or equal to the selected variable lockout time.

Since a fast clerk will consistently process items at lower IAT's than a slower clerk, the lower average IAT for the fast clerk will result in a lower lockout time. The lower lockout time reduces the chances that a second identical item being passed over the scanner window will be ignored, requiring that it be rescanned. A slower clerk will, on the other hand, have a higher average IAT, which produce a higher lockout time. The higher lockout time reduces the chances that the same item will be detected and processed incorrectly as two separate but identical items.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 5 is a chart showing average inter-item arrival times and associated lockout times over a period of time.

DETAILED DESCRIPTION

Figures 1, 4:
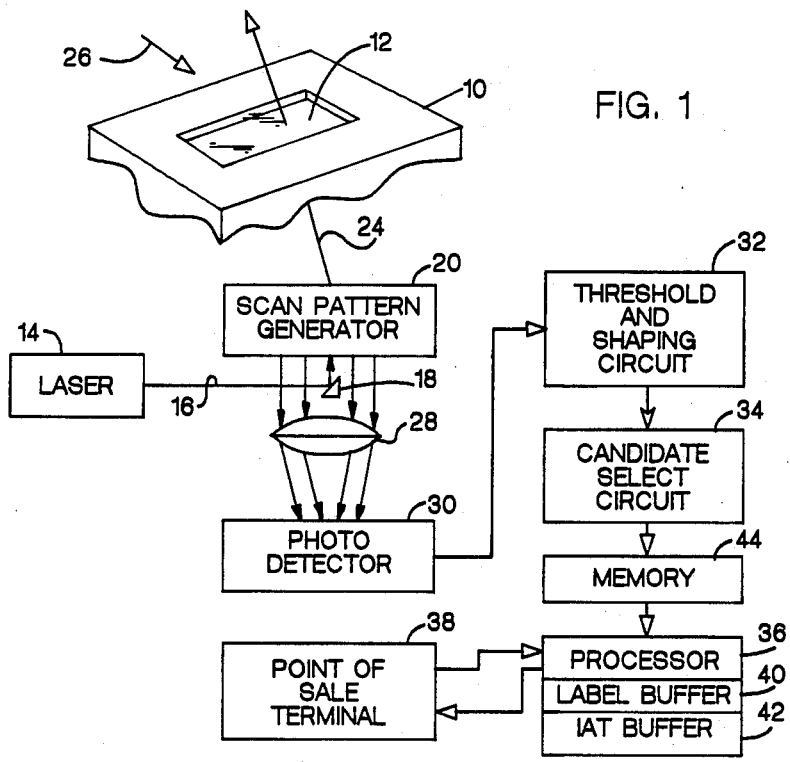
FIG. 1 is a block diagram of a point-of-sale system including a scanner which can be controlled in accordance with the inventive method.
FIG. 4 is a table which may facilitate an understanding of the method steps to be described with reference to FIG. 3.

Referring to FIG. 1, the type of scanner in which the present invention can be used is normally incorporated into a checkout stand in a retail store or supermarket. The top surface 10 of the scanner includes a transparent scanner window 12. The scanner components below the top surface 10 include a laser 14 which generates a coherent light beam 16. The light beam 16 is reflected from a small mirror 18 to a scan pattern generator 20. The scan pattern generator 20 normally includes a rotating component, such as a multi-faceted holographic disk or mirror, which acts in combination with one or more beam-folding mirrors to generate the individual scan lines which make up a multiline scan pattern. FIG. 1 shows a single beam 24 which is deflected along one line of that pattern.

Light reflected from a grocery item, which is normally passed over the window 12 in the direction indicated by arrow 26, may be retro-reflected through the scan pattern generator 20 to the mirror 18. Most of the returning light bypasses mirror 18 and is focussed by a lens 28 onto photodetector 30. The photo detector 30 converts the returned optical signal to an electrical signal which is applied to a threshold and shaping circuit 32. The function of the circuit 32 is to convert the irregular signals provided by photo detector 30 into a square wave pulse train in which the duration of each pulse is a function of the width of the light or dark area on an item surface being traversed by the laser beam.

The output of the threshold and shaping circuit 32 is applied to a candidate select circuit 34 which isolates any label candidate signals from the overall string of signals, most of which are optical noise signals produced as the laser beam traverses text or graphics areas on the item. Partial label candidates detected in circuit 34 are loaded into a memory 44. A processor 36 uses label formation programming or code to scan the memory and form complete label candidates from the stored partial candidates. When certain timing requirements are met, the complete label finally selected candidate is transferred to the point-of-sale terminal 38 where price look-up, inventory control, etc., operations are initiated. The timing requirements, dynamically adjusted through the use of the present invention, are discussed in detail below.

A label buffer 40 associated with processor 36 is capable of storing the last sixteen different candidates that have met all requirements, other than timing requirements, for transfer to terminal 38. The label buffer 40 also stores the time of arrival of each of the transferred candidates. An inter-item arrival time or IAT buffer 42 is also associated with processor 36. The IAT buffer 42 stores the last sixteen elapsed times between successive candidates actually transferred to the terminal 38.

Processor 36 must be capable of determining when a scan operation is apparently complete, partial label candidates should be decoded and a complete candidate should be transferred to the terminal 38. Known techniques can be used for determining when a scan operation is apparently complete. One known technique is to end a scan operation if the same candidate is decoded three times within a given time period. If three identical decodes are obtained, the scanner attempts to form a complete candidate using partial label candidates. Another known technique is to start a relatively short timeout each time a single partial label candidate is successfully decoded. When the timeout ends, the scanner attempts to form a complete label candidate from the available partial label candidates. If a complete candidate meets necessary tests, the candidate is made available for transfer to the terminal 38.

Further details as to the techniques mentioned above are available in U.S. Pat. No. 4,431,912, which is assigned to the assignee of the present invention. However, the details of the techniques are not essential to an understanding of the present invention. The only thing that must be understood is that processor 36 must be programmed to determine when a scan operation is normally considered to be complete.

The present invention is a method which is executed when the processor has a label candidate available for transfer to terminal 38. The method determines whether the available candidate is the result of a valid scan operation or whether the candidate is the result of duplicative signals produced by an item remaining above the scanner window too long.

As will be described in more detail below, a variable lockout time is established as a function of the performance level of the checkout clerk using the scanner. If the processor has a candidate available for transfer to the terminal, this candidate is compared to all candidate values stored in the label buffer. If a match is found, the elapsed time between the current candidate and the stored candidate is calculated. If the elapsed time is greater than the current lockout time, the current candidate is transferred to the terminal 38 and the time of arrival associated with the candidate value in the label buffer is set equal to the time of arrival of the current candidate. If, on the other hand, a match is found between the current candidate and a stored candidate value, but the elapsed time is less than the current lockout time, the system assumes that a single item has actually been detected. Any transfer of the current candidate to the terminal is inhibited but the time of arrival associated with the candidate value in the label buffer is nevertheless set equal to the time of arrival of the current candidate.

Referring briefly to FIG. 4, different values of lockout time (T0 to T8) may be established by the system as a function of checkout clerk productivity. The productivity is measured by determining the average time lapse between successful scan operations (that is, those resulting in candidates transferred to terminal 38) operations. The time lapse between successive operations may be referred to as the inter-item arrival time or IAT in the following description. The average inter-item arrival time may be referred to as the AIAT. The Index Level or IL value listed in FIG. 4 is an intermediate value which is used in deriving the variable lockout time.

Figure 2B:
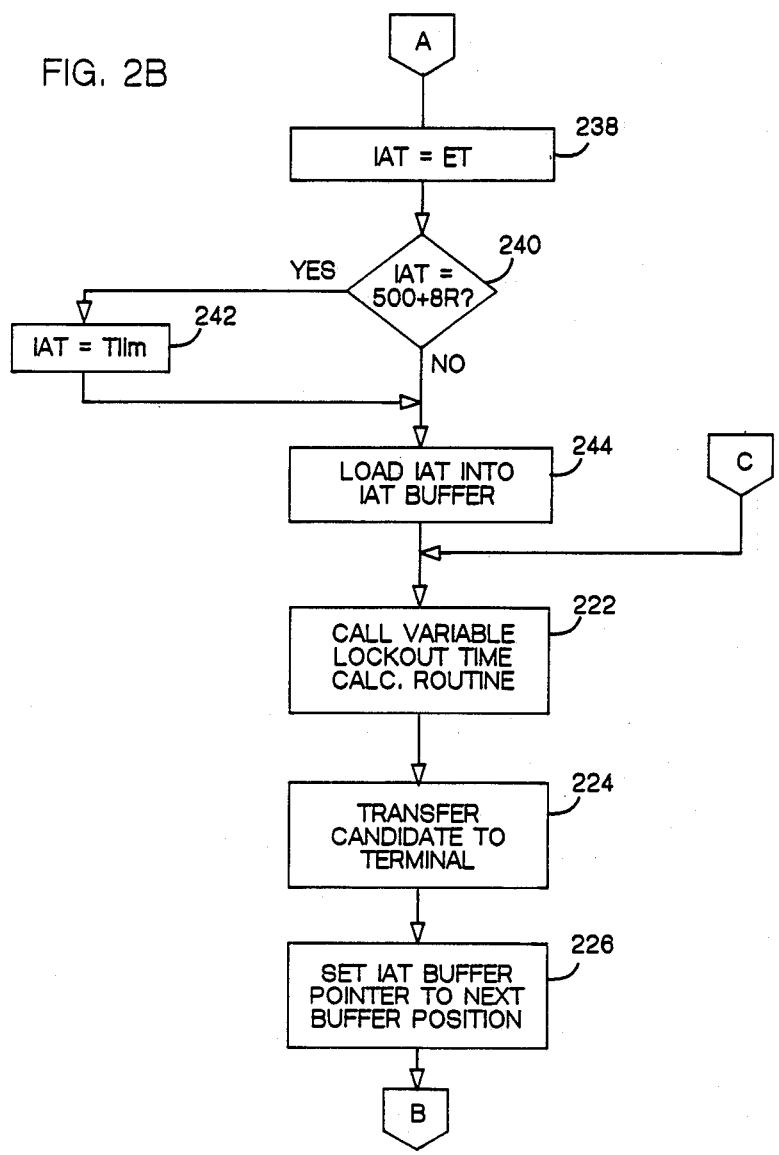
FIG. 2, consisting of FIGS. 2A and 2B taken together, is a flow chart of relevant steps in the operation of the scanner.

FIGS. 2A and 2B, taken together, are a flow chart of the steps which are executed by the processor 36 in order to determine whether a label candidate meets lockout time requirements. After the scanner is first powered up, an initial value of lockout time (LT) must be established. This is accomplished by writing the first position of the IAT buffer 42 (block 210) with a fixed IAT value. The pointer to the IAT buffer positions is incremented to point (block 212) to the next or second buffer position.

When the system has been initialized, normal scanning operations begin. During such operations, labels on grocery items are read and decoded. A time stamp (block 214) is assigned to each label candidate which satisfies normal error checking routines performed by processor 36. A check must be made to determine whether a first candidate flag is set (block 216) since the first candidate detected must be processed using a special series of steps. Assuming that check 214 shows the current candidate is the first candidate, the candidate value and its time stamp (or time of arrival) are loaded into the candidate buffer (block 218) and a zero value is loaded (block 220) into the second position in the IAT buffer. On the first candidate, the program jumps immediately to a call (block 222) of the variable lockout time calculation routine. The details of this routine are described later. The first candidate is transferred to the associated terminal 38 (block 224) without any timing checks and the IAT buffer position pointer is set (block 226) to the next available buffer position before the scanner is made ready for the next scan operation (block 214).

After the first candidate is detected, the check performed at block 216 will always be negative. The second and all subsequent current candidates will be compared (block 228) to each different candidate value stored in the candidate buffer 40. Buffer 40 preferably holds at least sixteen different candidate values.

If the current candidate matches (block 230) any of the stored candidate values, the elapsed time between the time of arrival of the current candidate and its match in the buffer 40 is calculated (block 232) using the time stamp of the current candidate and the time stamp associated with the matching stored candidate. After the elapsed time calculation is completed, the time stamp for the stored candidate value is updated (block 234) by over-writing it with the time stamp of the current candidate.

Where the current candidate matches a candidate value already stored in the buffer 40, a check is made (block 236) to determine whether the calculated elapsed time is greater than the last lockout time value that had been calculated. If the elapsed time is less than the current value of lockout time, the current candidate is discarded (i.e., any transfer to the associated terminal is inhibited) and the scanner is made ready for the next scan operation. If, however, the elapsed time is greater than the current lockout time, the current candidate satisfies the necessary timing requirements and will eventually be transferred to the associated terminal 38.

The calculated elapsed time value is used to update the current lockout time each time a candidate satisfies the timing requirements for transfer to the terminal 38. The calculated elapsed time is set equal (block 238) to an IAT or inter-item arrival time value and a check (block 240) is made to determine whether the IAT value exceeds a maximum allowable value, referenced as 500 ms+8R where R is the width of each range, as was described with reference to FIG. 4. if the IAT value exceeds this maximum value, it is limited (block 242) to a fixed value Tlim before any further calculations are performed. The reason for limiting the maximum IAT value is to avoid distorting the lockout time calculations due to the presence of extremely large IAT values that are normal at certain points during a checkout operation, but which do not reflect on a clerk's productivity. For example, when a clerk finishes processing items in a customer's order, that clerk cannot begin processing the next customer's items until the first customer's items have been bagged and the items have been paid for. This inter-customer delay may range from a few seconds to a few minutes. If such delays are not filtered from the lockout time calculation, the lockout time would probably always end up at its maximum allowable level.

The assigned (actual or maximum allowable) IAT value is loaded (block 244) into the next available position of the IAT buffer. The IAT buffer is preferably a sixteen position buffer. When all sixteen positions are filled, the current IAT value replaces the oldest IAT value then in the buffer.

The variable lockout time calculation routine is called (block 222) and the candidate is transferred (block 224) to the terminal before the IAT buffer is set (block 226) to the next available position.

The series of operations just described is performed each time the current candidate matches any of the sixteen different candidate values that can be stored in the candidate buffer. When the comparison at blocks 228 and 230 indicates that the current candidate does not match any of the stored candidate values, then a different series of operations are performed. The elapsed time between the current candidate and the most recent of any of the stored candidates is calculated (block 246). The value of the current candidate and its time stamp are then written into the candidate buffer (block 248), replacing the stored candidate having the oldest time stamp. A check (block 250) is made to determine whether the calculated elapsed time exceeds a minimum elapsed time value Tmin, usually much shorter than the minimum lockout time value.

If the calculated elapsed time is less than Tmin, the assumption is made that the current candidate value is the result of an invalid scan. Any transfer of the candidate is inhibited and the scanner is readied for the next scan operation. If, however, the elapsed time is greater than Tmin, then any current candidate which does not have a match in the candidate buffer is assumed to be valid. The series of steps shown in FIG. 2B is performed for any candidate for which no match is found in the candidate buffer as long as the elapsed time is greater than Tmin.

The routine which dynamically calculates the lockout time is called each time a candidate is transferred to the terminal. The routine updates the lockout time on a running basis so that it reflects the current level of performance of the clerk using the scanner.

Figure 3:
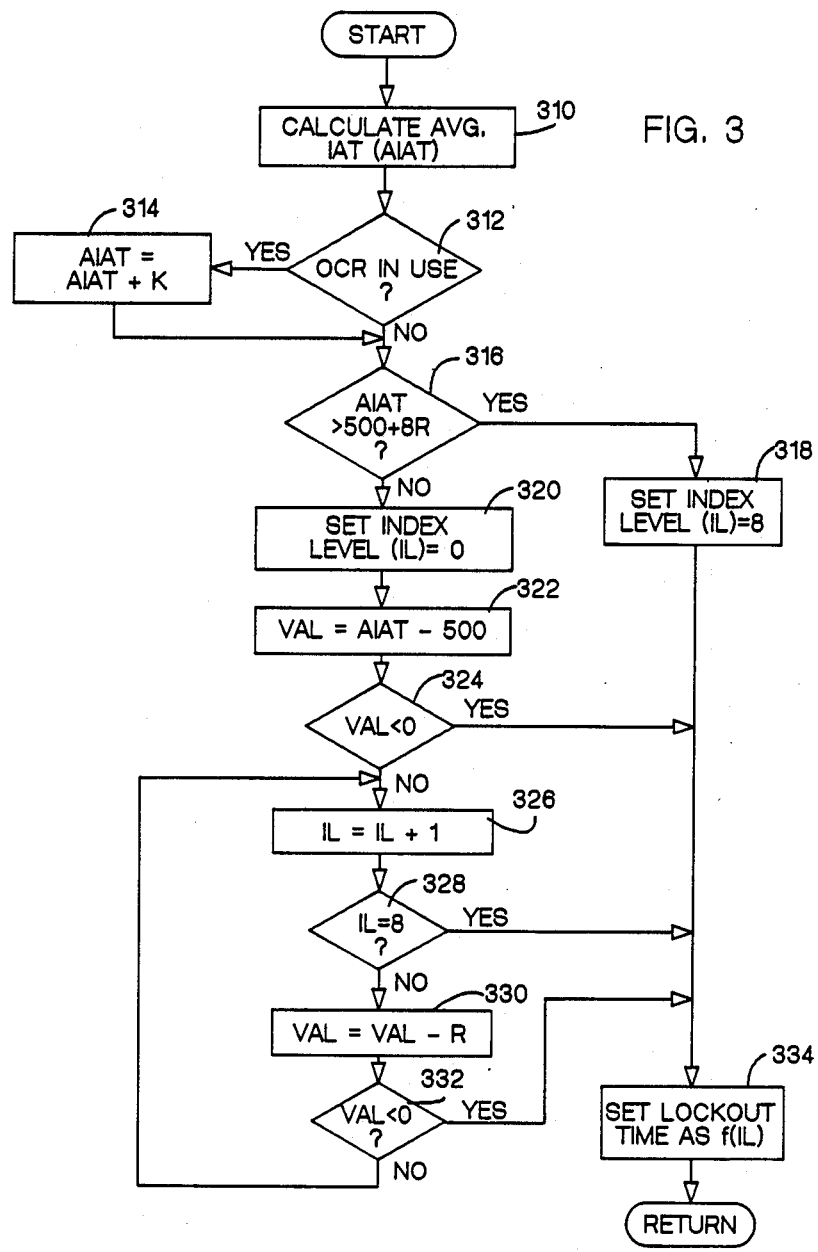
FIG. 3 is a flow chart of the method steps used to adjust lockout time to reflect differences in checkout clerk performance levels.

The routine used to update the variable lockout time is described with reference to FIG. 3. The initial step in the routine is to calculate an average IAT or AIAT (block 310) over a given number of successful scan operations; that is, over a given number of scan operations which result in a candidate being transferred to the terminal 38. In a preferred embodiment of this invention, the IAT buffer is a sixteen position buffer which stores the elapsed time between arrivals of the last sixteen candidates actually transferred to the terminal 38. The use of an average IAT value taken over a given number of scan operations reduces the chances that any single abnormal scan operation will disproportionately affect the calculated lockout time.

A check is then made (block 312) to determine data is being provided by a scanner of the type shown in FIG. 1 or transmitted over an OCR (optical character recognition) interface to the terminal 38. If an OCR interface is in use, the calculated AIAT value is incremented by a fixed value K (314).

A check is made (block 316) to determine whether the resulting AIAT value exceeds the upper limit (500 plus 8R) set forth in the IAT column in FIG. 4. If the AIAT value exceeds the upper limit of the table, the index level or IL value is set (block 318) equal to 8, which is the maximum allowable index level. If AIAT is equal to or less than the upper limit, the index level is reset to 0 (block 320) and a temporary variable VAL is established by subtracting 500 (block 322) from the AIAT value in use. If VAL is shown to have a negative value (block 324) indicating that the AIAT value was somewhere between 0 and 500, the index level remains set at 0. If VAL is not negative, IL is incremented by 1 (block 326) and a check is made (block 328) to determine whether IL equals 8. Assuming for the moment that the value of IL is not equal to 8, the variable VAL is further decremented by an amount R (block 330) equal to the width of one of the ranges in the left-hand column of FIG. 4. A check is then made to determine whether the decremented value of VAL is less than 0 (block 332). If the current value of VAL is greater than or equal to 0, the loop consisting of blocks 326, 328, 330 and 332 is reiterated until one of two things happens. If the check at block 328 indicates that the magnitude of IL is equal to 8, which is the maximum possible index level, the loop is exited with IL set equal to 8. If the check made at block 332 during one of the iterations of the loop indicates that VAL has a negative value, the loop is exited with IL set equal to the value last assigned in block 326.

It will be seen that there are four exits from the lockout time calculation routine. Two of those exits (at blocks 316 and 328) will result in an index level or IL value of 8. The exit in block 324 will result in an index level of 0 while the exit at 332 will result in an index level value of 1 through 7 depending upon the number of iterations. The index level attained is used to retrieve a variable lockout time (block 334) from memory. The memory would store eight lockout times as a function of IL as illustrated in tabular form in FIG. 4.

FIG. 5 includes a curve 510 of an average IAT value taken over a given number of successive successful scan operations. The same figure includes a curve 512 of the variable lockout time which is calculated using the present invention for the average IAT values shown in curve 510. It can be seen that the lockout time curve 512 generally tracks the IAT curve 510 although the upper limit for the variable lockout time is set considerably below the maximum possible IAT time. A highly productive clerk will maintain a relatively low average IAT value which, in turn, will lead to a relatively low variable lockout time. Conversely, a clerk who is less productive will have a higher average IAT value and a higher lockout time.

What is claimed is:

1. For use in a scanner for scanning and decoding labels on items, a method of inhibiting the transfer to an associated terminal of duplicative signals produced by a label carried on a single item, said method comprising the steps of:
    recording a time of arrival and a value for each of a plurality of different decoded label candidates;
    calculating inter-item arrival times (IAT) for successive pairs of candidates actually transferred to the terminal;
    calculating an average IAT for the last N transferred candidates where N is a positive integer;
    selecting a lockout time as a function of the calculated average IAT;
    calculating an elapsed time between a current label candidate and the most recent recorded candidate where the current candidate does not match a recorded candidate or between the current candidate and a recorded candidate matching the current candidate; and
    inhibiting the transfer of the current candidate when it matches the previously transferred candidate and the calculated elapsed time is within the selected lockout time.

2. For use in a scanner for scanning and decoding labels on items, said scanner being a type which will transfer decoded label candidates to an associated terminal only where a minimum time has elapsed between a current candidate and a next earlier candidate having the same value as the current candidate, a method of adjusting the minimum time to reflect operator performance, said method comprising the steps of:
    recording the time of arrival of each candidate transferred to the terminal;
    calculating an average inter-item arrival time over a given number of successive transferred candidates; and adjusting the minimum time as a function of the calculated average inter-item arrival time.

3. A method as defined in claim 2 including the step of inhibiting the transfer to the terminal of any candidate which matches the previously transferred candidate and which is received within the previously calculated minimum time.

4. A method as defined in claim 3 including the additional step of inhibiting the transfer of any candidate which is received within a fixed minimum time from the most recent candidate, regardless of whether such received candidate matches the most recent candidate.

5. A method as defined in claim 4 wherein the average inter-item arrival time is calculated on a rolling basis with each new recorded time of arrival replacing the oldest previously recorded time of arrival.

6. A method as defined in claim 5 wherein the calculated minimum time is adjusted on a rolling basis as a 7. A method as defined in claim 6 wherein the step of adjusting the minimum time further includes the steps of:
   determining which of several possible ranges of values the calculated average inter-item arrival time is within; and
   selecting a single minimum time for any calculated average inter-item arrival time falling within that range, the minimum time being different for each of the several possible ranges.

8. A method as defined in either of claims 4 or 7 including the additional step of adjusting the calculated average inter-item arrival time as a function of the type of scanner being used.

9. For use in a scanner capable of scanning and decoding labels, said scanner being a type which will transfer decoded candidates to an associated terminal only where a minimum time between matching candidates has elapsed, a method of adjusting the minimum time to reflect operator performance, said method comprising the steps of:
   establishing the time of arrival of each candidate;
   calculating inter-item arrival times for successive pairs of candidates actually transferred to the terminal;
   assigning a fixed inter-item arrival time whenever the actual inter-item arrival time exceeds a predetermined value;
   calculating the average inter-item arrival time over a given number of successive transferred candidates; and
   adjusting the minimum time as a function of the calculated average inter-item arrival time.

10. A method as defined in claim 9 including the initial step of inhibiting the transfer of any current candidate which is received within a previously calculated minimum time after an earlier matching candidate.

11. A method as defined in claim 10 wherein the average inter-item arrival time is calculated on a rolling basis with each new time of arrival replacing the oldest previously recorded time of arrival.

12. A method as defined in claim 11 wherein the minimum time is adjusted on a rolling basis as a function of each newly calculated average inter-item arrival time.

13. A method as defined in claim 11 wherein the step of adjusting the minimum time further includes the steps of:
   determining which of several possible ranges of values the calculated average inter-item arrival time is within; and
   selecting a single minimum time for any calculated average inter-item arrival time falling within that range, the minimum time being different for each of the several possible ranges.

14. A method as defined in either one of claims 9 or 13 including the additional step of adjusting the calculated average inter-item arrival time as a function of the type of scanner being used.

15. A method as defined in claim 9 including the additional step of inhibiting the transfer of any candidate which is received within a fixed minimum time after the last candidate regardless of whether the current candidate matches the last transferred candidate.

* * * * *